United States Patent [19]
Weststrate

[11] 3,815,934
[45] June 11, 1974

[54] VEHICLE PASSIVE OCCUPANT RESTRAINING BELT ARRANGEMENT

[75] Inventor: Willem J. J. Weststrate, Washington, Mich.

[73] Assignee: General Motors Corporation, Detroit, Mich.

[22] Filed: Sept. 11, 1972

[21] Appl. No.: 288,158

Related U.S. Application Data

[63] Continuation of Ser. No. 174,664, Aug. 25, 1971, abandoned, and a continuation-in-part of Ser. No. 118,607, Feb. 25, 1971, abandoned.

[52] U.S. Cl............................................ 280/150 SB
[51] Int. Cl............................................. B60n 21/02
[58] Field of Search ............................. 280/150 SB

[56] References Cited
UNITED STATES PATENTS

| | | | |
|---|---|---|---|
| 2,937,882 | 5/1960 | Oppenheim | 28/150 SB |
| 3,411,602 | 11/1968 | Royce | 280/150 SB |
| 3,506,083 | 4/1970 | Bontick | 280/150 SB |
| 3,583,726 | 6/1971 | Lindblad | 280/150 SB |

*Primary Examiner*—Robert R. Song
*Attorney, Agent, or Firm*—Herbert Furman

[57] ABSTRACT

A vehicle passive occupant restraining belt arrangement includes a first belt having one end fixed to an upper inboard portion of a vehicle seat and the other end fixed adjacent a lower inboard portion of the seat, an apertured member slidably receiving the first belt to define shoulder and lap belt portions, a second belt having one end secured to the apertured member and the other end received by a conventional inertia retractor mounted on the lower rear portion of a vehicle door, and a flexible cable having one end secured to the apertured member and the other end received by a vehicle body mounted retractor positioned adjacent the outboard forward portion of the vehicle body occupant compartment and responsive to door movement. When the door is in closed position, the cable is protracted from the body mounted retractor and the second belt is retracted within the inertia retractor to position the apertured member in a lower rearward position positioning the shoulder and lap belt portions in occupant restraining positions across a seated occupant. During door opening movement, the body mounted retractor retracts the cable to move the apertured member longitudinally of the vehicle body to an upper forward position as the inertia retractor allows protracting movement of the second belt and movement of the shoulder and lap belt portions to easy-enter positions. During closing movement of the door, the body mounted retractor allows protracting movement of the cable as the inertia retractor retracts the second belt moving the apertured member to the lower rearward position and the shoulder and lap belt portions to the occupant restraining positions.

3 Claims, 3 Drawing Figures

VEHICLE PASSIVE OCCUPANT RESTRAINING BELT ARRANGEMENT

This application is a continuation of Ser. No. 174,664, which was filed on Aug. 25, 1971, abandoned and is a continuation-in-part of Ser. No. 118,607, which was filed on Feb. 25, 1971 abandoned, the two latter applications being assigned to the assignee of the present invention.

This invention relates to a vehicle passive occupant restraining belt arrangement in which shoulder and lap belt portions are moved between easy-enter and occupant restraining positions in response to door movement.

It is known to provide a passive occupant restraining belt arrangement in which a belt is fixed to a carrier that is slidably mounted on a vehicle door for movement between forward and rearward positions in response to door opening and closing movement to move the belt between easy-enter and occupant restraining positions without requiring any effort on the part of the occupant. It is also known to provide a vehicle occupant restraining belt arrangement in which a belt has one end received by a door mounted belt retractor that retracts the belt to maintain the belt arrangement in an occupant restraining position when the door is closed.

This invention provides a vehicle passive occupant restraining belt arrangement in which a body mounted retractor and a door mounted inertia retractor are operatively connected to shoulder and lap belt portions and move the belt portions between occupant restraining and easy-enter positions in response to door movement.

In the preferred embodiment, the belt arrangement includes a first belt having one end fixed to an upper inboard portion of the seat and the other end fixed adjacent a lower inboard portion of the seat with the intermediate portion of the first belt slidably receiving an apertured member to define shoulder and lap belt portions. The apertured member attaches one end of a second belt whose other end is received within a conventional inertia retractor mounted on a lower rear portion of a vehicle door. The apertured member also attaches one end of a flexible cable whose other end is received within a body mounted retractor responsive to door opening and closing movement. When the door is in closed position, the inertia retractor retracts the second belt to move the apertured member to a lower rearward position thus positioning the lap and shoulder belt portions in occupant restraining positions. During opening movement of the door, the inertia retractor allows protracting movement of the second belt as the body mounted retractor retracts the cable and moves the apertured member to an upper forward position moving the shoulder and lap belt portions from the occupant restraining positions to easy-enter positions allowing convenient occupant egression from and ingression to the vehicle body. During closing movement of the door, the body mounted retractor allows protracting movement of the cable as the inertia retractor retracts the second belt and moves the apertured member to the lower rearward position and the shoulder and lap belt portions to the occupant restraining positions.

One of the features of this invention is that it provides a door mounted inertia retractor and a body mounted retractor which are operatively connected to a common member slidably mounted on a portion of a vehicle body restraint belt to move the belt between occupant restraining and easy-enter positions in response to opening and closing movement of the door, with the common member moving relative to the belt upon movement of the belt between these positions. Another feature of this invention is that the body mounted retractor is connected to the common member by a flexible cable and the door mounted retractor is connected to the common member by a belt which cooperates with portions of the belt on which the common member is mounted to cooperatively define shoulder and lap belt portions.

These and other features of this invention will be readily apparent from the following detailed description and drawings in which.

Figure 1:
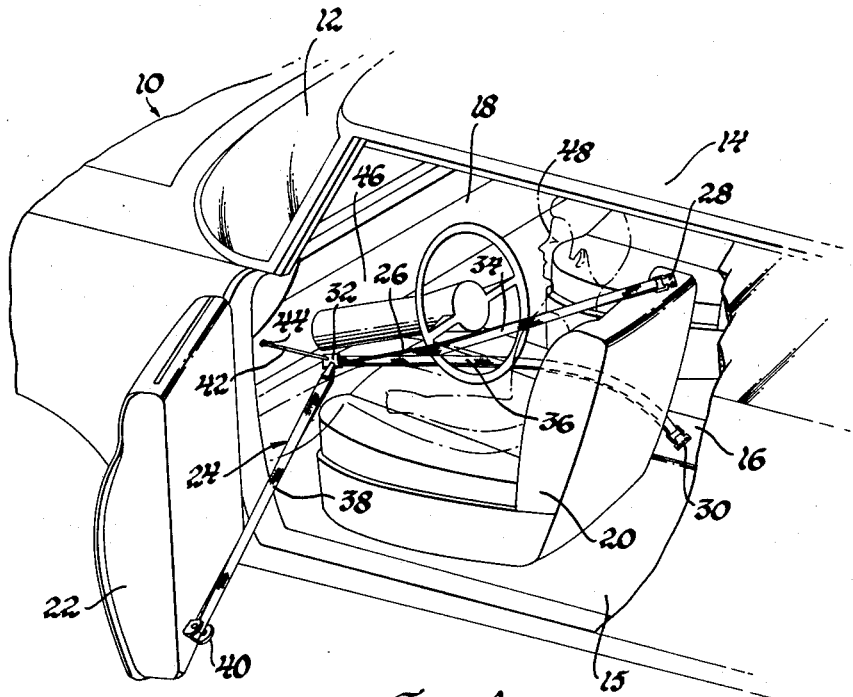
FIG. 1 is a perspective view of a portion of a vehicle body including a belt arrangement according to the invention shown in an easy-enter position with the vehicle body door in open position.

Referring now to the drawings, a vehicle body generally indicated by 10 includes a conventional windshield 12 and roof 14 that cooperate with a floor 15 including the usual transmission tunnel 16 to define an occupant compartment 18. A conventional vehicle seat 20 is supported on the floor 15 within the occupant compartment 18 in the usual manner and is accessible through a vehicle body door opening selectively opened and closed by a vehicle body door 22 whose front edge is pivoted to the vehicle body 10 to mount the door 22 for movement between the FIG. 1 door open position and the FIG. 2 door closed position.

A belt arrangement generally indicated by 24 includes a first belt 26 whose one end is fixed to the upper inboard portion of the back of seat 20 by a bracket 28. The other end of the first belt 26 is secured to the transmission tunnel 16 by a bracket 30 inboard of the seat and generally below the one end of belt 26. An apertured plate 32 slidably receives an intermediate portion of belt 26 to define a shoulder belt portion 34 and a lap belt portion 36. The plate 32 fixedly attaches one end of a second belt 38 whose other end is received by a conventional inertia retractor 40 mounted adjacent the lower rear portion of door 22 in a suitable manner. One end of a flexible cable 42 is also fixedly attached to plate 32 and the other end extends through an aperture 44 in the vehicle instrument panel 46 adjacent the outboard portion of the occupant compartment 18. The other end of cable 42 is received by a body mounted retractor positioned forward of instrument panel 46 and responsive to door opening and closing movement, as will be described.

Figure 2:
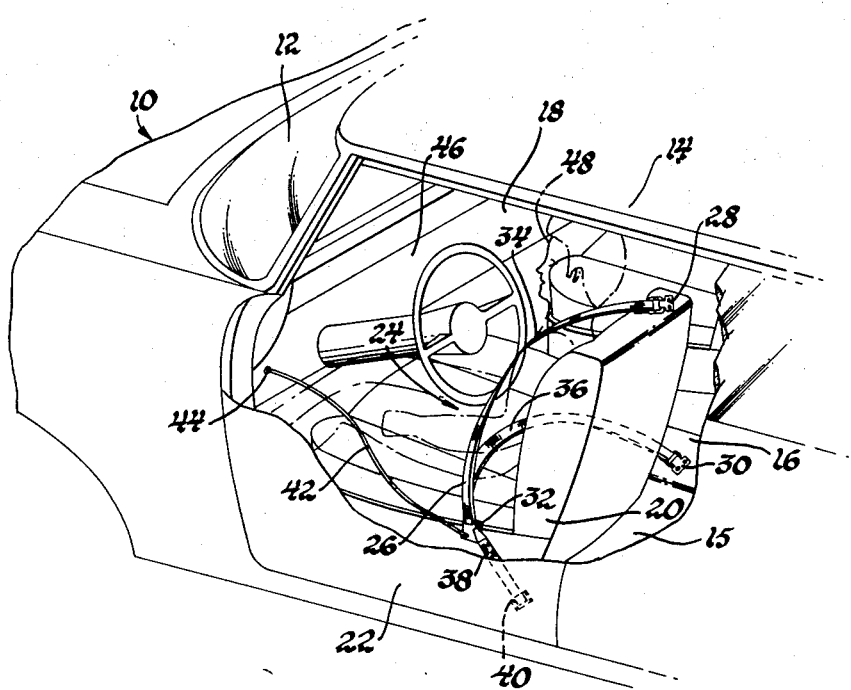
FIG. 2 is a view of the portion of the vehicle body partially broken away with the door in closed position and with the belt arrangement moved to an occupant restraining position.

When the door 22 is in the FIG. 2 closed position, the cable 42 is protracted from the body mounted retractor through the aperture 44 in instrument panel 46 and the belt 38 is retracted within the inertia retractor 40 to position the apertured member 32 in a lower rearward position. The belt 26 slides through the apertured plate 32 in the lower rearward position to provide the required length for the shoulder and lap belt portions 34 and 36, respectively, thus positioned in occupant restraining position with respect to the phantom line indicated seated occupant 48. During door opening movement, a suitable drive mechanism connected to the body mounted retractor receiving cable 42 responds to actuate the body mounted retractor and retract the cable 42. The retraction of the cable 42 moves the plate 32 from the lower rearward position of FIG. 2 longitudinally of the vehicle body to an upper forward position. FIG. 1, as the inertia retractor 40 allows protracting movement of belt 38, of course at a rate below that which will lock inertia retractor 40. As the plate 32 moves to the upper forward position, the shoulder and lap belt portions 34 and 36 move from the occupant restraining positions of FIG. 2 to the easy-enter positions of FIG. 1 allowing convenient egression of occupant 48 from the vehicle body 10.

When the occupant subsequently again enters the vehicle body 10 assuming a seated position and subsequently closes the door 22, the drive mechanism actuates the vehicle body mounted retractor to allow protracting movement of cable 42 as inertia retractor 40 retracts belt 38 and moves the plate 32 from the upper forward position to the lower rearward position thus moving the shoulder and lap belt portions 34 and 36 to the occupant retraining position, as previously described, without any effort on the part of the occupant.

Figure 3:
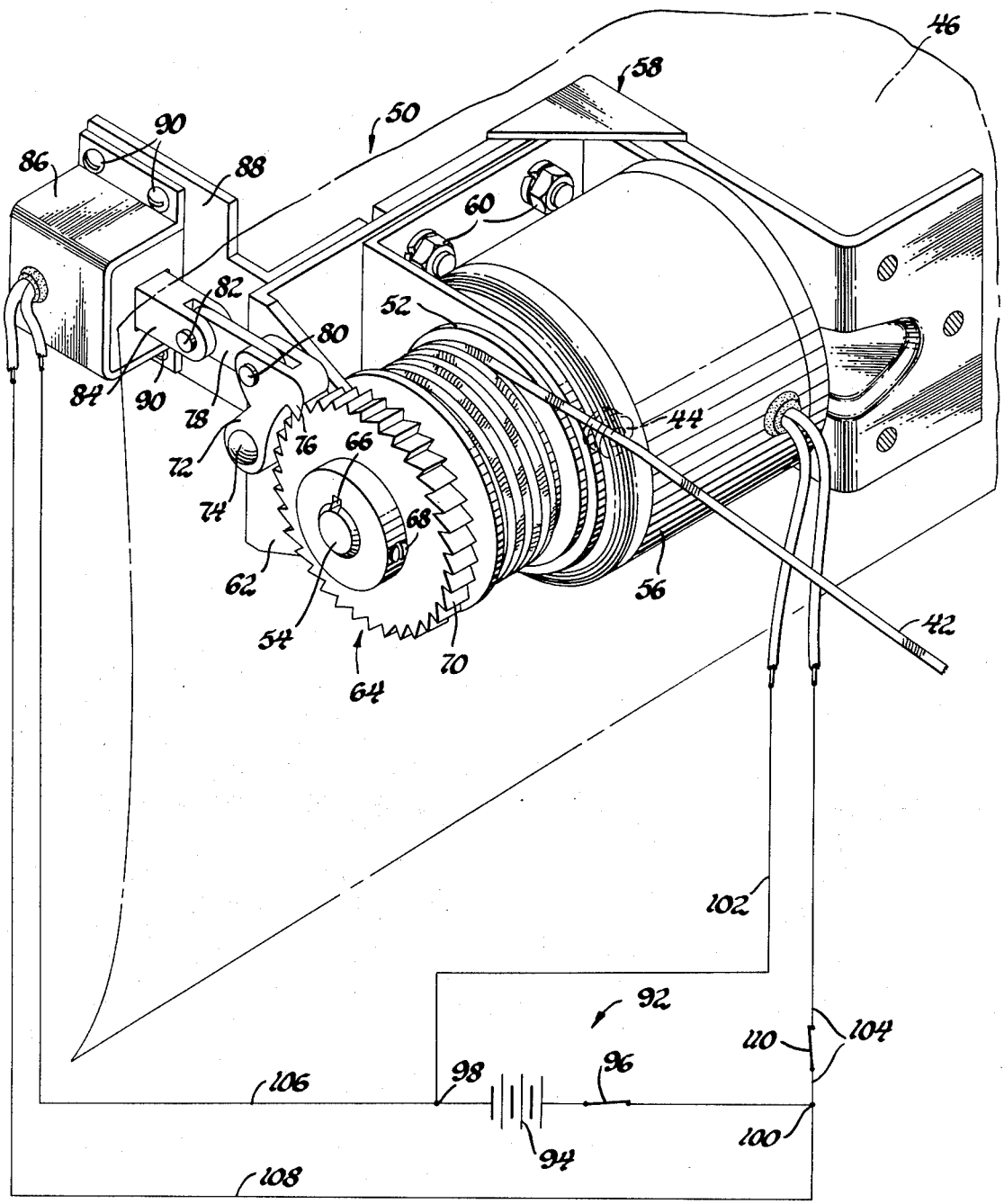
FIG. 3 is a partially perspective and partially schematic view of a vehicle body mounted retractor and electric motor with an associated circuit for controlling the movement of the belt arrangement.

The drive mechanism which actuates the body mounted retractor that receives cable 42 may include an arcuate gear rack mounted on the door 20 and engageable with a suitable body mounted rotatable pinion that is attached to a flexible cable connected to the body mounted retractor such that door opening and closing movement rotates the pinion and thus the body mounted retractor to retract and protract the cable 42 as required. The vehicle body mounted retractor may also take the form generally indicated in FIG. 3 by 50 and include a spool 52 for receiving the cable 42 extending through aperture 44 in instrument panel 46. Spool 52 is suitably fixed to an output shaft 54 of an electric motor 56. A bracket arrangement generally indicated by 58 is secured to the vehicle body 10 by nut and bolt arrangements 60 and mounts the spool 52 and motor 56 forward of instrument panel 46 in an out-of-sight position. Outboard of a flange 62 of bracket arrangement 58, the end of shaft 54 supports a locking gear generally indicated by 64. A key 66 fixed the locking gear 64 against rotational movement relative to shaft 54 and a screw 68 provides a temporary positioning means for aligning the gear slot and shaft slot prior to receiving the key. The outer edge of locking gear 64 includes teeth 70 that point generally clockwise as shown in FIG. 3 in a direction opposite to the direction of rotation of spool 52 when cable 42 is being wound. A pawl 72 is pivoted to flange 62 by a pin 74 and includes a nose 76 selectively engageable with the clockwise oriented face of a selected tooth 70 to prevent unwinding of the cable 42 from spool 52. The opposite ends of a link 78 are pivoted by respective pins 80 and 82 to pawl 72 and to an armature arm 84 of a solenoid 86. A flange 88 of bracket arrangement 58 supports the solenoid 86 on vehicle body 10 by way of bolts 90. The solenoid 86 includes a spring, not shown, that normally biases the armature arm 84 to a retracted position where link 78 positions pawl 72 out of engagement with locking gear 64. An electric circuit generally indicated at 92 includes a source of power 94 and a seraily connected switch 96. The ends 98 and 100 of circuit 92 connect the circuit in parallel to motor 56 and solenoid 86 by leads 102 and 104 and by leads 106 and 108, respectively. Switch 96 may be of any suitable construction such that it operates like a door jamb switch and is closed during opening movement to energize the motor 56 and wind the cable on spool 52. During the winding of cable 42, the circuit 92 energizes solenoid 86 to move the pawl 72 to the FIG. 3 locked position. With the pawl 72 in this position, the output torque of motor 56 as it winds cable 42 is sufficiently great to act against the energized solenoid 86 and reciprocate the armature arm 84 as the nose 76 of pawl 72 rides over the teeth 70 of the rotating locking gear 64. When the belt arrangement 24 reaches the easy-enter position, plate 32 engages the instrument panel 46 and a torque responsive switch 110 in lead 104 opens to deenergize the motor 56. The solenoid 86, however, remains energized and the pawl 72 holds the belt arrangement in the easy-enter position. When the door is closed, the switch 96 is opened and the solenoid is deenergized such that the spring retracts armature arm 86 to move pawl 72 to the unlocked position, whereupon the retractor 40 retracts belt 38 and moves the belt arrangement 24 to the occupant restraining position while the cable 42 unwinds from spool 52.

The invention thus provides an improved vehicle passive occupant restraining belt arrangement in which a body mounted retractor and a door mounted inertia retractor move shoulder and lap belt portions between occupant restraining and easy-enter positions in response to door movement.

What is claimed is:

1. In combination with a vehicle body including a floor supporting a seat located outboard of a first belt attachment portion and accessible through an adjacent vehicle body door opening which is selectively opened and closed by a vehicle body door having a second belt attachment portion, a passive occupant restraining belt arrangement comprising, restraint belt means extending across the seat between the first and second belt attachment portions and having inboard and outboard ends, belt retractor means mounted on one of the belt attachment portions and receiving one of the belt ends of the restraint belt means to extend and retract the belt means during opening and closing movement of the door, means for securing the other belt end of the restraint belt means to the other belt attachment portion, a generally flexible elongated element with one end attached to the restraint belt means intermediate the belt ends thereof, and element retractor means mounted on the vehicle body forward of the seat and receiving the other end of the elongated element so as to retract the elongated element in response to door opening movement and pull the restraint belt means forwardly to an easy-enter position as the belt retractor means extends the restraint belt means, the element retractor means extending the elongated element in response to door closing movement to allow the belt retractor means to retract the restraint belt means and move the restraint belt means rearwardly to a restraining position relative to a seated occupant without any deliberate effort on the part of the occupant.

2. In combination with a vehicle body including a floor supporting a seat located outboard of upper and lower belt attachment portions and accessible through an adjacent vehicle body door opening which is selectively opened and closed by a vehicle body door having a belt attachment portion, a passive occupant restraining belt arrangement comprising, restraint belt means including shoulder and lap belt portions, first and second belt attachment means respectively securing the inboard ends of the shoulder and lap belt portions to the upper and lower belt attachment portions of the vehicle body, third belt attachment means for securing the outboard ends of the shoulder and lap belt portions to the belt attachment portion of the door to dispose the shoulder and lap belt portions across the seat, one of the belt attachment means including belt retractor means receiving an adjacent belt end of the restraint belt means so as to extend and retract the restraint belt means in response to opening and closing movement of the door, a generally flexible elongated element with one end attached to a portion of the restraint belt means intermediate the belt attachment portions, and element retractor means mounted on the vehicle body forward of the seat and receiving the other end of the elongated element so as to retract the elongated element in response to door opening movement and pull the restraint belt means forwardly to an easy-enter position as the belt retractor means extends the restraint belt means, the element retractor means extending the elongated element in response to door closing movement to allow the belt retractor means to retract the restraint belt means and move the lap and shoulder belt portions of the restraint belt means rearwardly to a restraining position relative to a seated occupant without any deliberate effort on the part of the occupant.

3. In combination with a vehicle body including a floor and a roof defining an occupant compartment in which is mounted a vehicle seat accessible through a vehicle body door opening selectively opened and closed by a vehicle body door whose front edge is pivotally secured to the vehicle body, a passive occupant restraining belt arrangement comprising, a first belt having one end fixed to an upper inboard portion of the seat and the other end fixed adjacent a lower inboard portion of the seat generally below the one end, an apertured member slidably receiving an intermediate portion of the first belt to define a shoulder belt portion between the one end of the first belt and the apertured member and to define a lap belt portion between the other end of the first belt and the apertured member, a second belt having one end secured to the apertured member, an inertia retractor mounted on the inboard lower rear portion of the door and receiving the other end of the second belt, the retractor normally retracting the second belt with the door in closed position to maintain the apertured member in a lower rearward position positioning the lap belt portion across the lap of a seated occupant and the shoulder belt portion across the chest of the occupant in restraining positions, retractable means mounted on the vehicle body adjacent the outboard forward portion of the occupant compartment and above the apertured member in the lower rearward position, an elongated flexible member having one end secured to the apertured member and the other end received by the retractable means, and control means for actuating the retractable means to retract the flexible member during opening movement of the door to move the apertured member longitudinally of the vehicle body from the lower rearward position to an upper forward position moving the shoulder and lap belt portions from the restraining positions to easy-enter positions as the inertia retractor allows protracting movement of the second belt, the control means actuating the retractable means during door closing movement to allow protraction of the flexible member from the retractable means as the inertia retractor retracts the second belt moving the apertured member from the upper forward position to the lower rearward position and the shoulder and lap belt portions to the restraining positions.

* * * * *